United States Patent
Chou et al.

(10) Patent No.: US 9,001,805 B2
(45) Date of Patent: Apr. 7, 2015

(54) ELECTRONIC DEVICE HAVING NETWORK CONNECTION FUNCTION AND METHOD FOR DETERMINING CONNECTION MODE BETWEEN ELECTRONIC DEVICE AND ACCESS POINT

(75) Inventors: Hsin-I Chou, Taipei (TW); Kuang-Yu Yen, Hsinchu County (TW); San-Ho Wei, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 256 days.

(21) Appl. No.: 13/342,206

(22) Filed: Jan. 3, 2012

(65) Prior Publication Data
US 2012/0177020 A1   Jul. 12, 2012

(30) Foreign Application Priority Data

Jan. 12, 2011   (CN) .......................... 2011 1 0005986

(51) Int. Cl.
*H04W 76/02* (2009.01)
*H04W 76/04* (2009.01)
*H04W 48/16* (2009.01)
*H04W 84/12* (2009.01)

(52) U.S. Cl.
CPC .............. *H04W 76/04* (2013.01); *H04W 48/16* (2013.01); *H04W 84/12* (2013.01)

(58) Field of Classification Search
CPC ..... H04W 76/02; H04W 76/04; H04W 84/12; H04W 36/14; H04W 88/08; H04W 52/265; H04W 52/267; H04L 1/0002

USPC .................. 370/338, 342; 455/41.5, 82, 574; 709/221

See application file for complete search history.

(56) References Cited

U.S. PATENT DOCUMENTS

| | | | |
|---|---|---|---|
| 2008/0026695 A1* | 1/2008 | Choi et al. | 455/41.3 |
| 2009/0003302 A1* | 1/2009 | Klein et al. | 370/342 |
| 2009/0137214 A1* | 5/2009 | Hofmann et al. | 455/82 |
| 2010/0023609 A1* | 1/2010 | Vangala et al. | 709/221 |
| 2010/0304794 A1* | 12/2010 | Beninghaus et al. | 455/574 |
| 2011/0128946 A1* | 6/2011 | Saito et al. | 370/338 |

FOREIGN PATENT DOCUMENTS

TW   200822626   5/2008

* cited by examiner

*Primary Examiner* — Kwang B Yao
*Assistant Examiner* — Syed M Bokhari
(74) *Attorney, Agent, or Firm* — Winston Hsu; Scott Margo (57) ABSTRACT

An electronic device having network connection function includes a receiving unit and a control unit, where the electronic device and an access point support a plurality of connection modes. The receiving unit is utilized for receiving a signal from the access point. The control unit is utilized for selecting a specific connection mode from the plurality of connection modes according to a determination result generated by determining whether the signal satisfies a predetermined condition, and starting to connect to the access point by using the specific connection mode, where a data rate of the specific connection mode is not a highest data rate among that of the plurality of connection modes.

12 Claims, 6 Drawing Sheets

ELECTRONIC DEVICE HAVING NETWORK CONNECTION FUNCTION AND METHOD FOR DETERMINING CONNECTION MODE BETWEEN ELECTRONIC DEVICE AND ACCESS POINT

BACKGROUND OF THE INVENTION

1. Field of the Invention

The present invention relates to an electronic device having network connection function, and more particularly, to an electronic device having network connection function and a method for determining a connection mode between an electronic device and an access point.

2. Description of the Prior Art

When a wireless local area network (WLAN) device (e.g., a notebook having a network connection function) intends to connect to an access point, the WLAN device will choose a connection mode with a highest data rate and use this connection mode to be connected with the access point. For example, if both the WLAN device and the access point support 802.11n and 802.11g connection modes, the WLAN device will use 802.11n to connect to the access point because the data rate of 802.11n is higher than that of 802.11g. In practice, however, by considering the compatibility between the WLAN device and the access point, signal noise caused by the air quality, and the packet collision occurs when the WLAN device and the access point transmit carries, when the WLAN uses 802.11n connection mode that has a higher data rate, the WLAN may not successfully receive the packets from the access point. Therefore, the access point will transmit these transmitting-failed packets repeatedly, causing a decreasing throughput of the WLAN. More seriously, the throughput of the WLAN using 802.11n connection mode may be worse than the throughput of the WLAN using 802.11g connection mode. For example, in normal condition the data rate of the WLAN is 30 Mb/s when using 802.11n connection mode, however, in some special conditions, the data rate of the WLAN may be only 11-12 Mb/s when using 802.11n connection mode. In fact, the WLAN may have a higher data rate when using 802.11g connection mode at this time.

In addition, if the WLAN has both the wireless network and Bluetooth devices, in order to decrease the volume of the WLAN, the wireless network and Bluetooth devices are generally designed to share two antennas inside the WLAN. However, if the WLAN simultaneously enables wireless network and Bluetooth functions, interferences may be occurred when the WLAN uses the Bluetooth device to transmit/receive data, causing data transmitting-failed or receiving failed, and the throughput of the WLAN is decreased.

SUMMARY OF THE INVENTION

It is therefore an objective of the present invention to provide an electronic device having network connection function and a method for determining a connection mode between an electronic device and an access point, where the electronic device directly uses a connection mode having a lower data rate to connect to the access point, to solve the above-mentioned problems.

According to one embodiment of the present invention, an electronic device having network connection function includes a receiving unit and a control unit, where the electronic device and an access point support a plurality of connection modes. The receiving unit is utilized for receiving a signal from the access point. The control unit is utilized for selecting a specific connection mode from the plurality of connection modes according to a determination result generated by determining whether the signal satisfies a predetermined condition, and starting to connect to the access point by using the specific connection mode, where a data rate of the specific connection mode is not a highest data rate among that of the plurality of connection modes.

According to another embodiment of the present invention, a method for determining a connection mode between an electronic device and an access point is disclosed, where the electronic device and the access point support a plurality of connection modes. The method comprises: receiving a signal from the access point; and selecting a specific connection mode from the plurality of connection modes according to a determination result generated by determining whether the signal satisfies a predetermined condition, and starting to connect to the access point by using the specific connection mode, where a data rate of the specific connection mode is not a highest data rate among that of the plurality of connection modes.

According to another embodiment of the present invention, an electronic device includes a first network device, a second network device and a control unit, where the first network device and an access point support a plurality of connection modes. The control unit is coupled to the first network device and the second network device, and is utilized for selecting a specific connection mode from the plurality of connection modes according to a detecting result generated by detecting whether the second network device is activated or not, and starting to connect to the access point by using the specific connection mode, where a data rate of the specific connection mode is not a highest data rate among that of the plurality of connection modes.

According to another embodiment of the present invention, a method for determining a connection mode between an electronic device and an access point is disclosed, where the electronic device includes a first network device and a second network device, and the first network device and an access point support a plurality of connection modes. The method comprises: detecting whether the second network device is activated or not to generate a detecting result; and selecting a specific connection mode from the plurality of connection modes according to the detecting result, and starting to connect to the access point by using the specific connection mode, where a data rate of the specific connection mode is not a highest data rate among that of the plurality of connection modes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
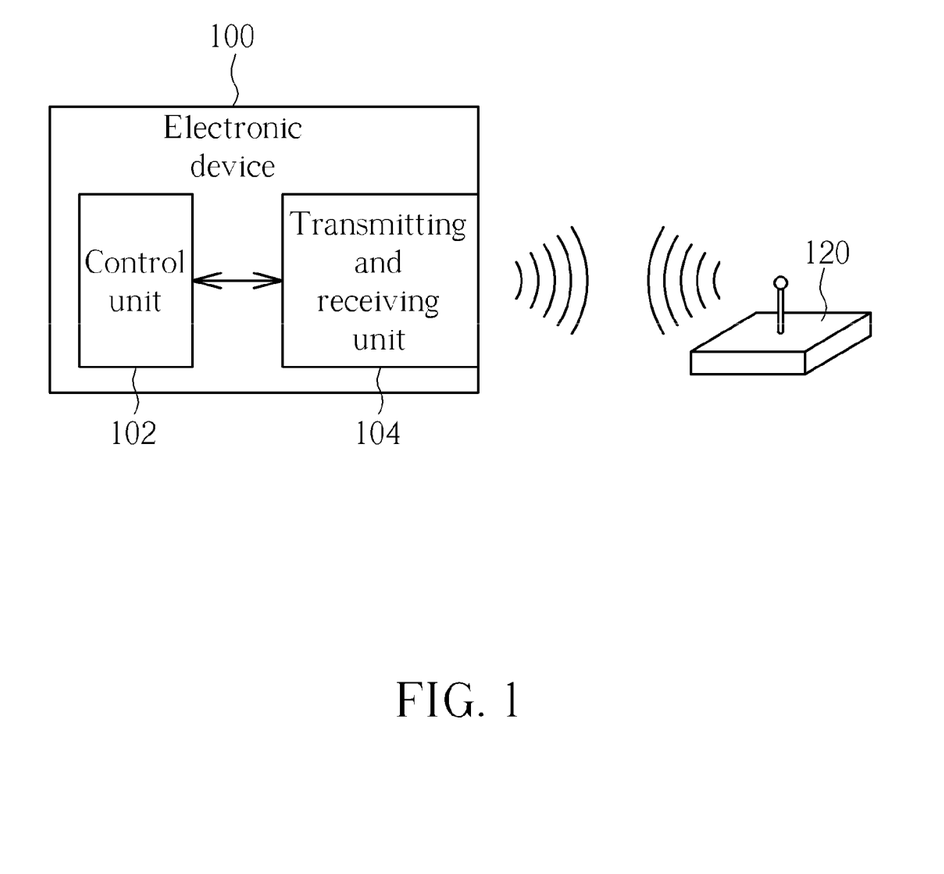
FIG. 1 is a diagram illustrating an electronic device according to one embodiment of the present invention.

Please refer to FIG. 1, which is a diagram illustrating an electronic device 100 according to one embodiment of the present invention. As shown in FIG. 1, the electronic device 100 includes a control unit 102 and a transmitting and receiving unit 104, where the electronic device 100 can transmit and receive packets to an access point 120 by using the transmitting and receiving unit 104. In this embodiment, the electronic device 100 has network connection function, and the electronic device 100 and the access point 120 both support 802.11n and 802.11g connection modes. In addition, the electronic device 100 can be a notebook, cell phone or a personal digital assistant (PDA) et al., and the transmitting and receiving unit 104 can be one or more antennas.

Figure 2:
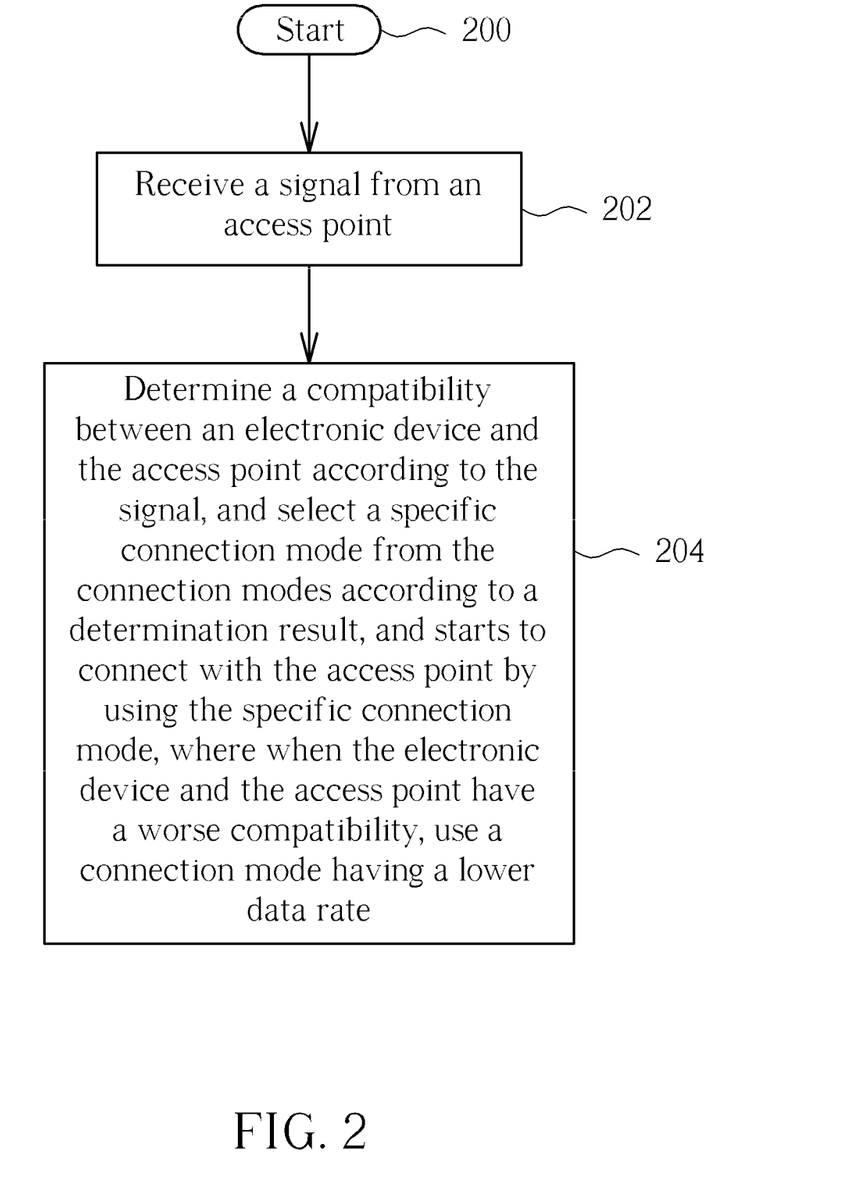
FIG. 2 is a flowchart of a method for determining a connection mode between the electronic device and the access point according to a first embodiment of the present invention.

Please refer to FIG. 1 and FIG. 2 together. FIG. 2 is a flowchart of a method for determining a connection mode between the electronic device 100 and the access point 120 according to a first embodiment of the present invention. Referring to FIG. 2, the flow is described as follows.

In the embodiment shown in FIG. 2, initially the electronic device 100 does not establish any link to the access point 120. In Step 200, the flow starts, and the electronic device 100 intends to connect to the access point 120. In Step 202, the transmitting and receiving unit 104 receives a signal from the access point 120, where the signal can be a Beacon packet or a probe response packet which includes information about the access point 120 and satisfies the 802.11 protocol. Then, in Step 204, the control unit 102 determines the compatibility between the electronic device 100 and the access point 120 by determining whether the signal satisfies a predetermined condition, then the control unit 102 selects a specific connection mode from the connection modes according to a determination result, and starts to connect with the access point 120 by using the specific connection mode. For example, if the electronic device 100 and the access point 120 have a better compatibility, the control unit 102 uses the connection mode having highest data rate (in this embodiment, that is 802.11n mode supporting modulation coding scheme MCS0-MCS15) to connect to the access point 120; if the electronic device 100 and the access point 120 have a worse compatibility, the control unit 102 uses the connection mode having lower data rate (in this embodiment, that is 802.11n mode supporting modulation coding scheme MCS0-MCS7 or 802.11g mode) to connect to the access point 120. It is noted that the above-mentioned 802.11n mode supporting modulation coding scheme MCS0-MCS15, 802.11n mode supporting modulation coding scheme MCS0-MCS7 and 802.11g are merely the examples for the connection modes having high or low data rate, and are not meant to be a limitation of the present invention.

Figure 3:
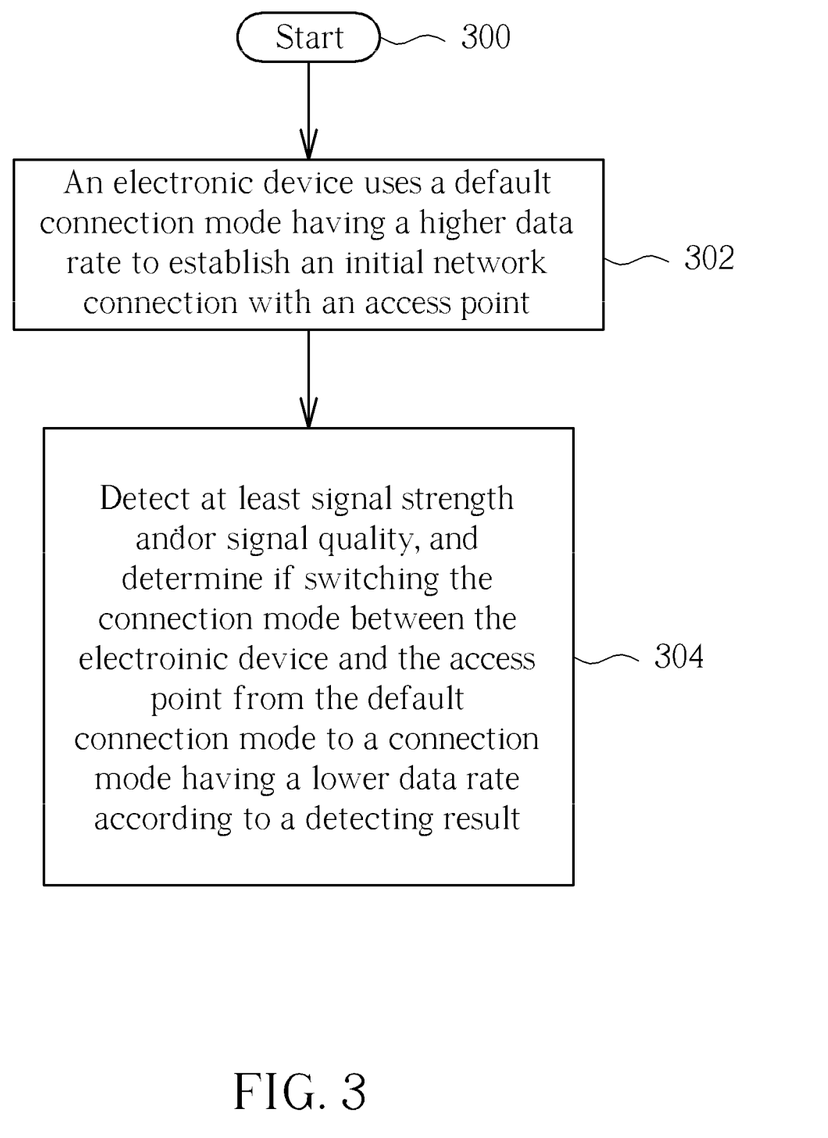
FIG. 3 is a flowchart of a method for determining a connection mode between the electronic device and the access point according to a second embodiment of the present invention.

Please refer to FIG. 1 and FIG. 3. FIG. 3 is a flowchart of a method for determining a connection mode between the electronic device 100 and the access point 120 according to a second embodiment of the present invention. Referring to FIG. 2, the flow is described as follows.

In Step 300, the flow starts. In Step 302, the electronic device 100 uses a default connection mode having a higher data rate to establish an initial network connection with the access point 120, in this embodiment, the default connection mode is the 802.11n mode supporting modulation coding scheme MCS0-MCS15. Then, in Step 304, the control unit 102 detects the throughput of the data received by the electronic device 100 from the access point 120, and/or signal strength and/or signal quality, and determines if switching the connection mode between the electronic device 100 and the access point 120 from the default connection mode to a connection mode having lower data rate (in this embodiment, that is 802.11n mode supporting modulation coding scheme MCS0-MCS7 or 802.11g mode) according to a detecting result. For example, if the throughput detected by the control unit 102 does not exceed a throughput threshold; or if the quality (performance) of the signal does not exceed a performance threshold; or if the throughput detected by the control unit 102 is much worse than expected, but the signal strength or the signal quality are not worse than expected (i.e., lower than a threshold value or a little worse than expected); or if the throughput detected by the control unit 102 is much worse than expected, but there are not much signal noise caused by the air condition/quality, the control unit 102 can be disconnected from the access point 120, and re-establishes the network connection to the access point 120 by using the connection mode having a lower data rate (e.g., 802.11n mode supporting modulation coding scheme MCS0-MCS7 or 802.11g mode). It is noted that the above-mentioned 802.11n mode supporting modulation coding scheme MCS0-MCS15, 802.11n mode supporting modulation coding scheme MCS0-MCS7 and 802.11g are merely examples for the connection modes having high or low data rate, and are not meant to be a limitation of the present invention.

Figure 4:
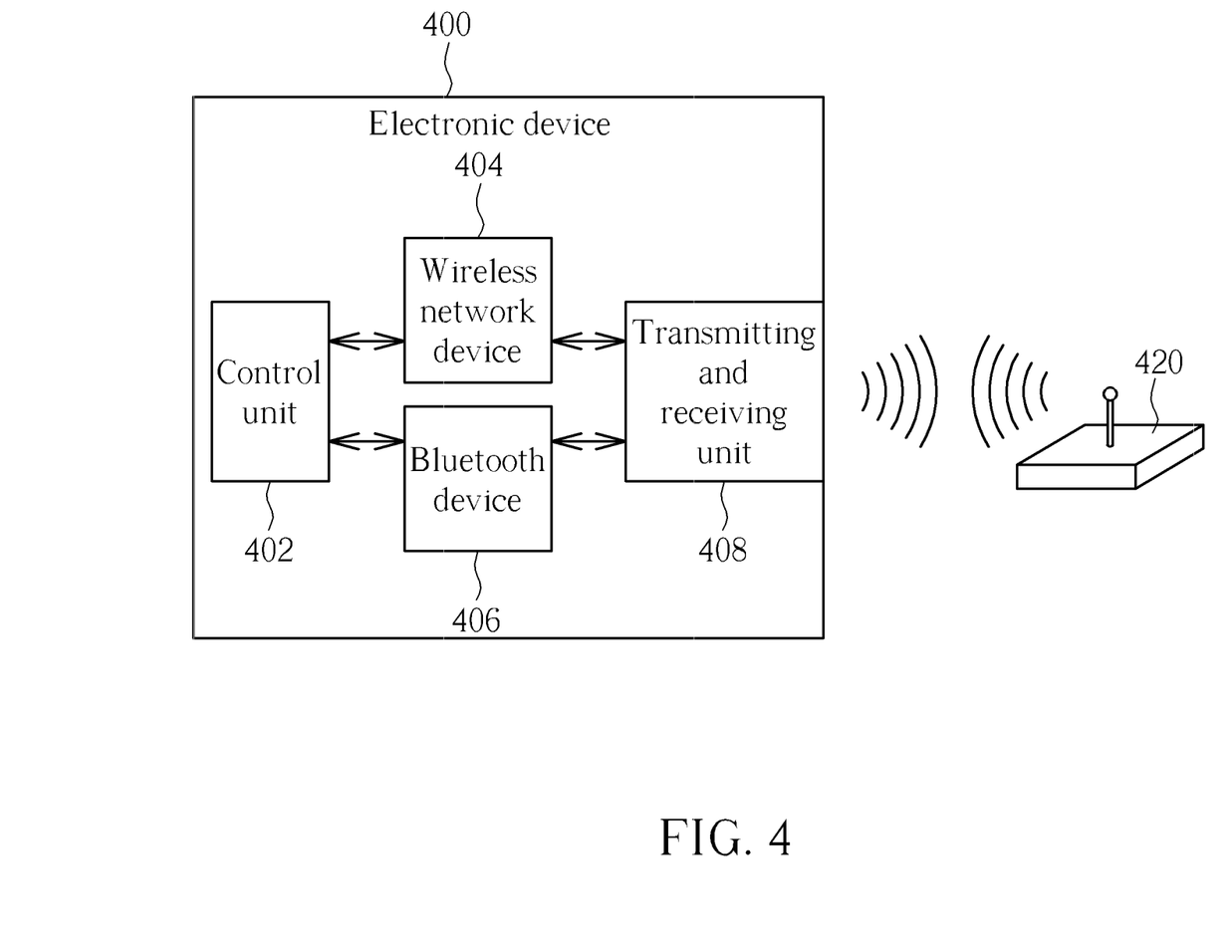
FIG. 4 is a diagram illustrating an electronic device according to another embodiment of the present invention.

Please refer to FIG. 4, which is a diagram illustrating an electronic device 400 according to another embodiment of the present invention. As shown in FIG. 4, the electronic device 400 includes a control unit 402, a first network device (in this embodiment, a wireless network device 404 serves as the first network device), a second network device (in this embodiment, a Bluetooth device 406 serves as the first network device) and a transmitting and receiving unit 408, where the electronic device 400 can transmit and receive packets to/from an access point 420 by using the transmitting and receiving unit 408. In this embodiment, the electronic device 400 and the access point 420 both support at least 802.11n and 802.11g connection modes. In addition, the electronic device 400 can be a notebook, cell phone or a personal digital assistant (PDA) et al., the transmitting and receiving unit 408 can be a plurality of antennas, and the wireless network device 404 and the Bluetooth device 406 share the plurality of antennas.

Figure 5:
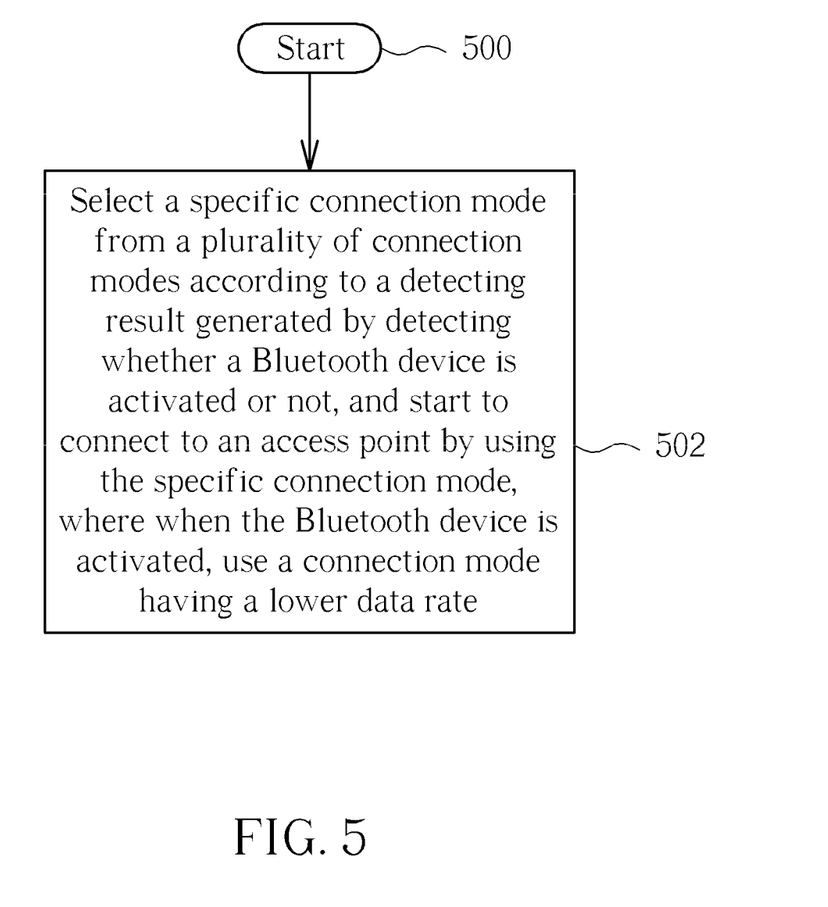
FIG. 5 is a flowchart of a method for determining a connection mode between the electronic device and the access point according to a third embodiment of the present invention.

Please refer to FIG. 4 and FIG. 5. FIG. 5 is a flowchart of a method for determining a connection mode between the electronic device 400 and the access point 420 according to a third embodiment of the present invention. Referring to FIG. 5, the flow is described as follows.

In the embodiment shown in FIG. 5, in Step 500, the flow starts, and the electronic device 400 intends to connect to the access point 420. In Step 502, the control unit 402 selects a specific connection mode from the plurality of connection modes according to a detecting result generated by detecting whether the Bluetooth device 406 is activated or not, and starts to connect to the access point 420 by using the specific connection mode. When the Bluetooth device 406 is activated, the control unit 402 uses a connection mode having a lower data rate (in this embodiment, this connection mode can be 802.11n 1*1 or 802.11g 1*1 that uses only one antenna of the transmitting and receiving unit 408, but it is not meant to be a limitation of the present invention) to connect to the access point 420.

Figure 6:
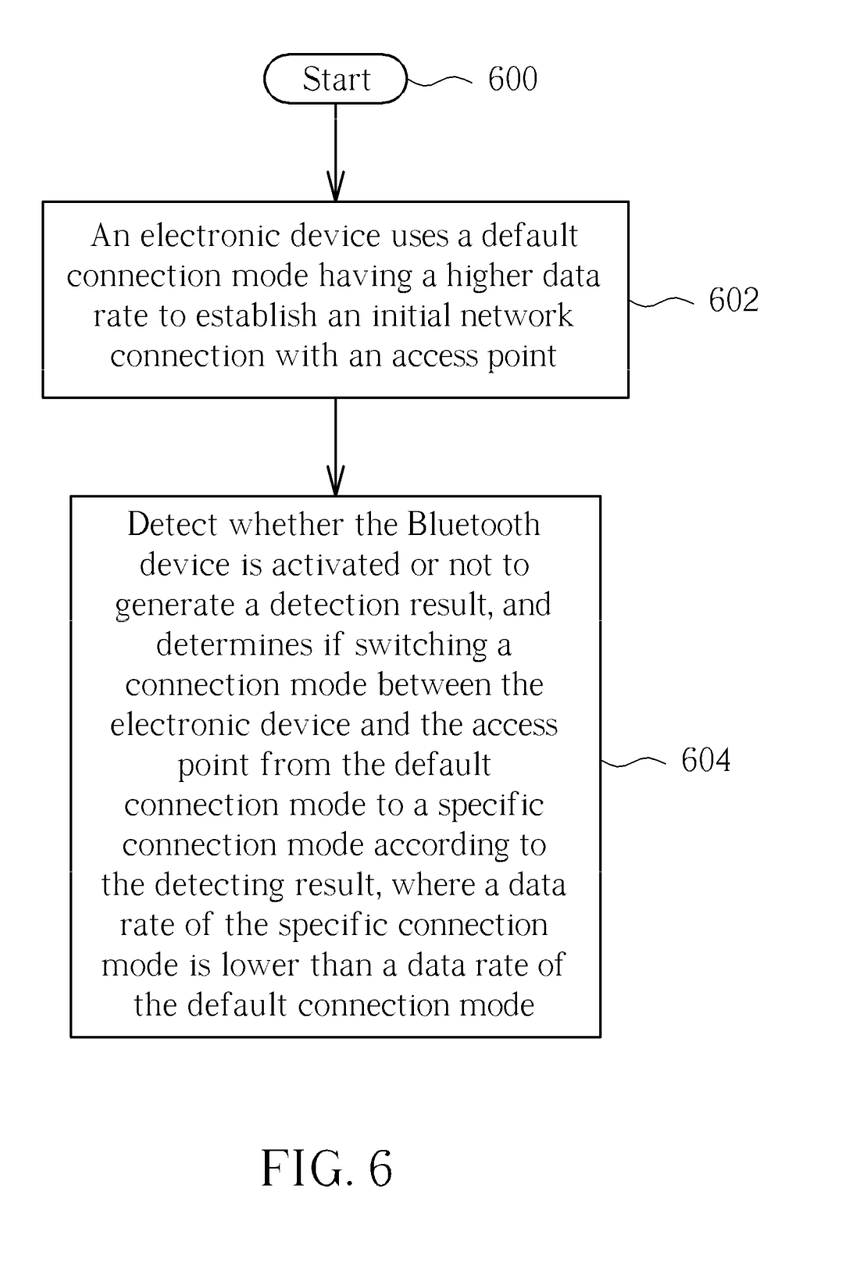
FIG. 6 is a flowchart of a method for determining a connection mode between the electronic device and the access point according to a fourth embodiment of the present invention.

Please refer to FIG. 4 and FIG. 6. FIG. 6 is a flowchart of a method for determining a connection mode between the electronic device 400 and the access point 420 according to a fourth embodiment of the present invention. Referring to FIG. 6, the flow is described as follows.

In Step 600, the flow starts. In Step 602, the electronic device 400 uses a default connection mode having a higher data rate to establish an initial network connection with the access point 120, in this embodiment, the default connection mode is 802.11n 2*2 or 802.11g 1*2 that uses two antennas of the transmitting and receiving unit 408. Then, in Step 604, the control unit 402 detects whether the Bluetooth device 406 is activated or not to generate a detection result, and determines if switching the connection mode between the electronic device 400 and the access point 420 from the default connection mode to a specific connection mode according to the detecting result. When it is detected that the Bluetooth device 406 is activated, the control unit 402 disconnects the network connection between the wireless network device 404 and the access point 420, and re-establishes the network connection to the access point 420 by using the connection mode having a lower data rate (e.g., 802.11n 1*1 or 802.11g 1*1 that uses only one antenna of the transmitting and receiving unit 408). It is noted that the above-mentioned 802.11n and 802.11g having one or two antennas are for illustrative purposes only, and are not meant to be a limitation of the present invention. In other embodiment, there may be 802.11ac or any connection mode having more antennas (e.g., three or four antennas). When both the Bluetooth device and the wireless network device simultaneously use two or more antennas to receive/transmit data, the interferences may happen more frequently, and the efficient of the Bluetooth device and the wireless network device is decreased. Therefore, in the embodiment shown in FIG. 4, when the control unit 402 detects that the Bluetooth device 406 and the wireless network device 404 work simultaneously, the control unit 402 degrades the Bluetooth device 406 and the wireless network device 404 to make the Bluetooth device 406 and the wireless network device 404 use different antenna to transmit/receive data. For example, if the electronic device 400 includes two antennas and the wireless network device 404 and the Bluetooth device 406 work simultaneously, the control unit 402 changes the working modes of the wireless network device 404 and the Bluetooth device 406 to make each of the network device 404 and the Bluetooth device 406 only uses a single antenna, that is to decrease the data rate of the wireless network device 404 and the Bluetooth device 406.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device having network connection function, wherein the electronic device and an access point support a plurality of connection modes, and when the electronic device starts to establish an initial network connection with the access point, the electronic device connects to the access point by utilizing a default connection mode of the plurality of connection modes, and the electronic device comprises:
   a transmitting and receiving unit, for receiving a signal from the access point; and
   a control unit, coupled to the transmitting and receiving unit, wherein the control unit determines if switching a connection mode between the electronic device and the access point from the default connection mode to a specific connection mode according to a determination result generated by determining both a degree of a throughput of data received by the electronic device from the access point and a degree of signal strength/quality of signals received from the access point;
   wherein a data rate of the specific connection mode is lower than a data rate of the default connection mode.

2. The electronic device of claim 1, wherein the signal is a Beacon packet or a probe response packet which satisfies the 802.11 protocol.

3. The electronic device of claim 1, wherein when a worsening degree of the throughput of data received by the electronic device from the access point is more serious than a worsening degree of the signal strength/quality of signals received from the access point, the control unit switches the connection mode between the electronic device and the access point from the default connection mode to the specific connection mode.

4. A method for determining a connection mode between an electronic device and an access point, wherein the electronic device and the access point support a plurality of connection modes, and when the electronic device starts to establish an initial network connection with the access point, the electronic device connects to the access point by utilizing a default connection mode of the plurality of connection modes, and the method comprises:
   receiving a signal from the access point; and
   determining if switching a connection mode between the electronic device and the access point from the default connection mode to a specific connection mode according to a determination result generated by determining both a degree of a throughput of data received by the electronic device from the access point and a degree of signal strength/quality of signals received from the access point;
   wherein a data rate of the specific connection mode is lower than a data rate of the default connection mode.

5. The method of claim 4, wherein the signal is a Beacon packet or a probe response packet which satisfies a 802.11 protocol.

6. The method of claim 4, wherein the step of determining if switching the connection mode between the electronic device and the access point from the default connection mode to the specific connection mode according to the determination result comprises: when a worsening degree of the throughput of data received by the electronic device from the access point is more serious than a worsening degree of the signal strength/quality of signals received from the access point, switching the connection mode between the electronic device and the access point from the default connection mode to the specific connection mode.

7. An electronic device, comprising:
   a first network device, wherein the first network device and the access point support a plurality of connection modes;
   a second network device; and
   a control unit, coupled to the first network device and the second network device, for selecting a specific connection mode from the plurality of connection modes according to a detecting result generated by detecting whether the second network device is activated or not, and starting to connect to the access point by using the specific connection mode;
   wherein when the electronic device starts to establish an initial network connection with the access point, the electronic device connects to the access point by utilizing a default connection mode of the plurality of connection modes; and when the control unit detects that the second network device is activated, the control unit switches a connection mode between the electronic device and the access point from the default connection mode to the specific connection mode, where the data rate of the specific connection mode is lower than a data rate of the default connection mode; and when the control unit detects that the second network device is not activated, the electronic device continues using the default connection mode as the connection mode between the electronic device and the access point.

8. The electronic device of claim 7, wherein one of the first network device and the second network device is a wireless network device, and the other one of the first network device and the second network device is a Bluetooth device.

9. The electronic device of claim 8, wherein when the first network device utilizes the specific connection mode, the first network device utilizes only one antenna to connect to the access point.

10. A method for determining a connection mode between an electronic device and an access point, wherein the electronic device comprises a first network device and the second network device, the first network device and the access point support a plurality of connection modes, and the method comprises:

detecting whether the second network device is activated or not to generate a detecting result; and selecting a specific connection mode from the plurality of connection modes according to the detecting result, and starting to connect to the access point by utilizing the specific connection mode;

wherein when the electronic device starts to establish an initial network connection with the access point, the electronic device connects to the access point by utilizing a default connection mode of the plurality of connection modes, and the step of selecting the specific connection mode from the plurality of connection modes according to the detecting result, and starting to connect to the access point by utilizing the specific connection mode comprises:

when it is detected that the second network device is activated, switching a connection mode between the electronic device and the access point from the default connection mode to the specific connection mode, where the data rate of the specific connection mode is lower than a data rate of the default connection mode; and when it is detected that the second network device is not activated, continuing using the default connection mode as the connection mode between the electronic device and the access point.

11. The method of claim 10, wherein one of the first network device and the second network device is a wireless network device, and the other one of the first network device and the second network device is a Bluetooth device.

12. The method of claim 11, wherein when the first network device utilizes the specific connection mode, the first network device utilizes only one antenna to connect to the access point.

* * * * *